(12) United States Patent
Goker et al.

(10) Patent No.: US 11,615,813 B1
(45) Date of Patent: Mar. 28, 2023

(54) END-TO-END FIXITY CHECK FOR ARCHIVAL STORAGE BASED ON HIGH-PERFORMANCE INTEGRITY TEST WITH DATA QUALITY USING SELF-DESCRIBING TAPE FORMAT

(71) Applicant: QUANTUM CORPORATION, San Jose, CA (US)

(72) Inventors: Turguy Goker, Oceanside, CA (US); Hoa Le, Orange, CA (US); Suayb Arslan, Sariyer/Istanbul (TR); Louie Almero, Cerritos, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 17/528,443

(22) Filed: Nov. 17, 2021

(51) Int. Cl.
*G11B 20/18* (2006.01)
*G06F 11/10* (2006.01)
*G06F 11/14* (2006.01)

(52) U.S. Cl.
CPC ........ *G11B 20/182* (2013.01); *G06F 11/1076* (2013.01); *G06F 11/1435* (2013.01); *G11B 20/1879* (2013.01); *G11B 2020/1823* (2013.01)

(58) Field of Classification Search
CPC .............. G11B 20/182; G11B 20/1879; G11B 2020/1823; G06F 11/1076; G06F 11/1435
See application file for complete search history.

(56) References Cited

U.S. PATENT DOCUMENTS

2009/0327505 A1* 12/2009 Rao ........................ H04L 9/3236
709/230
2018/0219683 A1* 8/2018 Deery ................... H04L 63/083

* cited by examiner

*Primary Examiner* — Kyle Vallecillo
(74) *Attorney, Agent, or Firm* — Roeder & Broder LLP; James P. Broder

(57) ABSTRACT

A method for ensuring data quality integrity on a magnetic tape includes the steps of writing object data to the magnetic tape; dividing the object data into a plurality of data chunks; generating a hash tree from the plurality of data chunks, the hash tree being formed in a plurality of levels, the hash tree including (i) a plurality of chunk hashes wherein a separate chunk hash is generated for each of the plurality of data chunks, and (ii) at least one second level hash that is generated from concatenation of at least two of the plurality of chunk hashes; and checking integrity of a first data chunk of the plurality of data chunks by evaluating at least one of the plurality of chunk hashes and the at least one second level hash.

20 Claims, 11 Drawing Sheets

END-TO-END FIXITY CHECK FOR ARCHIVAL STORAGE BASED ON HIGH-PERFORMANCE INTEGRITY TEST WITH DATA QUALITY USING SELF-DESCRIBING TAPE FORMAT

BACKGROUND

When preparing data for long-term archival storage, it is important to gain an understanding that the data is error-free before committing such data to long-term archival storage. When using current tape drive systems for such long-term archival storage, the tape drives typically do read-while-write verification. However, this is only for making sure the formatted data records are written to tape without any errors, and it does not address the issue of whether there may be undetected errors within the data records themselves. Thus, current systems typically have certain requirements that must be met before data can be copied to a tape for long-term archival storage.

To make sure there are no hidden errors in the original files or objects, an end-to-end data verification is required, especially for hyperscalers, which with today's systems require a separate read pass so the host can do a fixity check to make sure the data written to tapes are the correct (intended) files or objects. In particular, current cold storage (archival) systems, such as tape systems, require a separate pass by reading previously written data for an end-to-end fixity check when moving from one storage medium to another to ensure the data on tape does not have any hidden errors, such as due to an undetected bit flip, when it was stored on upper-level disks, Solid State Drives (SSDs)'s or even internal Dynamic Random Access Memory (DRAM). Unfortunately, there have been reported data loss problems involving tapes, including copies having undetected error files stored, which can result if not read by a separate pass. In that case, the errors go undetected causing permanent data loss since this affects all tape copies including cloud storage which may be holding the other copy.

Fixity, in the preservation sense, means the assurance that a file has remained unchanged, or is fixed. Current systems must do the separate read data pass to read data back to the host server and check higher-level hashes (e.g., Cyclic Redundancy Check ("CRC")) for true fixity checks. This requires passing the read data back to the host server and executing hash checks on large data sets by assigning hash values to certain sets of data. The term hash value refers to a piece of data, known as a value, given as the answer to a hash function. Hash functions, or hash algorithms, perform the operation of turning a large set of data into a smaller set which represents the full set.

When writing, the tape drive must have data in the drive buffer, otherwise streaming will stop and the tape drive must back-hitch before resuming streaming. In read mode, if the host does not read data from the tape drive because it is busy doing other tasks such as CRC calculations, the tape drive will fill the drive buffer and there is no storage space left for new data so it must stop and back-hitch, waiting for the drive buffer to empty out before streaming. More specifically, if the drive buffer is full, this will cause the tape drive to back-hitch, that is to stop, preposition stop, and wait for data in the drive buffer before resuming streaming, to catch up with the host that reads data from the tape drive. The host may go offline running CRC checks with data stored in various locations and returning to the tape drive. This may cause accelerated back-hitch motions that may cause more head wear due to increased number of passes across the tape heads, especially with the use of green media, such as current LTO-9 media. The separate pass not only increases the tape wear but magnetic heads too and extends to overall data store times. As tape format increases in capacity, the track/wrap numbers will also increase, potentially making this problem even worse.

Also, even the current systems perform fixity checks using an inefficient process, and they still do not test for the written data quality for long-term archival applications. For instance, even when a file or object is verified by a separate hash/CRC check, the system still may not know the quality of its written data such that correct data may be written. With unverified quality of data, very high data reliability applications for very long archival life data may not be achievable.

Back-hitches with high areal density tapes, such as current LTO-9 media with high track densities and thinner and smoother media, can result in stagger wraps due to air entrainment, and too many of these in a tape pack will affect the tape long-term durability. Tape stagger wrap is a phenomenon where the tape is wound onto the reel in an uneven fashion, i.e. the wound layers are laterally displaced from one another. This is caused by air entrainment into the pack and runout of the take-up reel. Stagger wraps, especially too many of them, can cause packing tension problems. Too many back-hitches result in too much tape motion with acceleration and deceleration motions back and forth across the heads which can contribute to early head wear. Stagger wraps can also be source for tracking transient in subsequent operations by this tape. Back-hitches also result in loss of performance since during back-hitch motions no data can be transferred, thereby affecting overall transfer rates. Thus, in ideal system operation, it is best to reduce stagger wraps and back-hitches by making sure the drive buffer is never empty during writes and never full during reads.

For tape systems, this means reading the data stored on tapes, checking fixity with hashing methods using system resources and I/O bandwidth after initial write and also for periodic test for scrubbing purposes. Unlike rotating magnetic storage or Flash Memory, streaming devices such as tapes result in streaming failures which in turn result in back-hitch or underrun motions. As described, these types of motions typically may result in system level performance and reliability problems such as head wear, loss of media durability and quality, loss of performance, and requiring of costly system resources. Regarding head wear, with back-hitch or underrun motions using still abrasive green media, head wear and even localized tape surface degradation may occur due to acceleration, deceleration and reversal-type tape motion tribology issues. Regarding loss of media durability and quality, high rate of change Start-Stop motions at high linear speeds using very thin and smooth media such as tape will result in air entrainment causing stagger wraps. Excessive sections of tape with stagger wraps when stored at rest may develop media edge and surface wear due to uneven packing tensions. Edge deformation with stagger wraps can also result in correlated tracking problems, which can affect the data reliability due to high C2 errors that may be a potential cause of hard read errors. Regarding loss of performance, best is when tape drives stream end-to-end and only stop-start when they reach either end of long media typically 1000 meters or more. For highly scaled applications where a large number of drives and media are used, loss of streaming between host servers and tape drives can result in lack of synchronicity, which can further accelerate back-hitch and underrun events. Regarding the requiring of costly system resources, with the issue being tape drives too fast compared to the host system, to prevent back-hitch and stream failure one would need faster response time, i.e., system resources and more cache storage and higher I/O capabilities which will all result in more expensive system design, increasing cost and power requirements.

In a proposed solution, ideally the tape drive can do a full fixity check during write, with its internal resources, but this typically requires changes to drive ASIC and architecture. Unfortunately, current drive technologies do not support this capability. Thus, it is desired to create a system and method to implement a fixity check with a separate read pass, but without causing extra tape motion and unnecessary back-hitches; thereby increasing the life of media and magnetic head.

SUMMARY

The present invention is directed toward a method for ensuring data quality integrity on a magnetic tape, the method including the steps of writing object data to the magnetic tape; dividing the object data into a plurality of data chunks; generating a hash tree from the plurality of data chunks, the hash tree being formed in a plurality of levels, the hash tree including (i) a plurality of chunk hashes wherein a separate chunk hash is generated for each of the plurality of data chunks, and (ii) at least one second level hash that is generated from concatenation of at least two of the plurality of chunk hashes; and checking integrity of a first data chunk of the plurality of data chunks by evaluating at least one of the plurality of chunk hashes and the at least one second level hash.

In some embodiments, the method further includes the step of generating an object hash from the object data.

In certain embodiments, the step of generating a hash tree includes the hash tree including an upper-level hash that is generated from concatenation of at least two lower-level hashes.

In various embodiments, the method can also include the step of comparing the object hash and the upper-level hash with one another to determine if they correlate with one another such that there is no evidence of error within the object data.

In some embodiments, the method also includes the step of copying the object data to a tape for long-term archival storage if there is no evidence of error in the object data.

In certain embodiments, the method also includes the step of formatting the magnetic tape by storing hash value metadata from the hash tree on the magnetic tape.

In some embodiments, the step of checking integrity includes performing fixity check for end-to-end data integrity without reading the object data from the magnetic tape.

In certain embodiments, the step of performing fixity check for end-to-end data integrity is performed within a tape drive using a drive controller of the tape drive.

In various embodiments, the step of checking integrity further includes using inconsistencies from the fixity check to identify one or more data chunks in error due to one of data integrity and data quality issues.

In some embodiments, the method can further include the step of formatting the magnetic tape by storing updated hash value metadata from the hash tree on the magnetic tape based on error identified in the one or more data chunks.

The present invention is also directed toward a data quality integrity testing system for ensuring data quality integrity on a magnetic tape, the data quality integrity testing system including a tape drive that is configured to write object data to the magnetic tape, the tape drive including a drive controller that is configured to perform the steps of: dividing the object data into a plurality of data chunks; generating a hash tree from the plurality of data chunks, the hash tree being formed in a plurality of levels, the hash tree including (i) a plurality of chunk hashes wherein a separate chunk hash is generated for each of the plurality of data chunks, and (ii) at least one second level hash that is generated from concatenation of at least two of the plurality of chunk hashes; and checking integrity of a first data chunk of the plurality of data chunks by evaluating at least one of the plurality of chunk hashes and the at least one second level hash.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
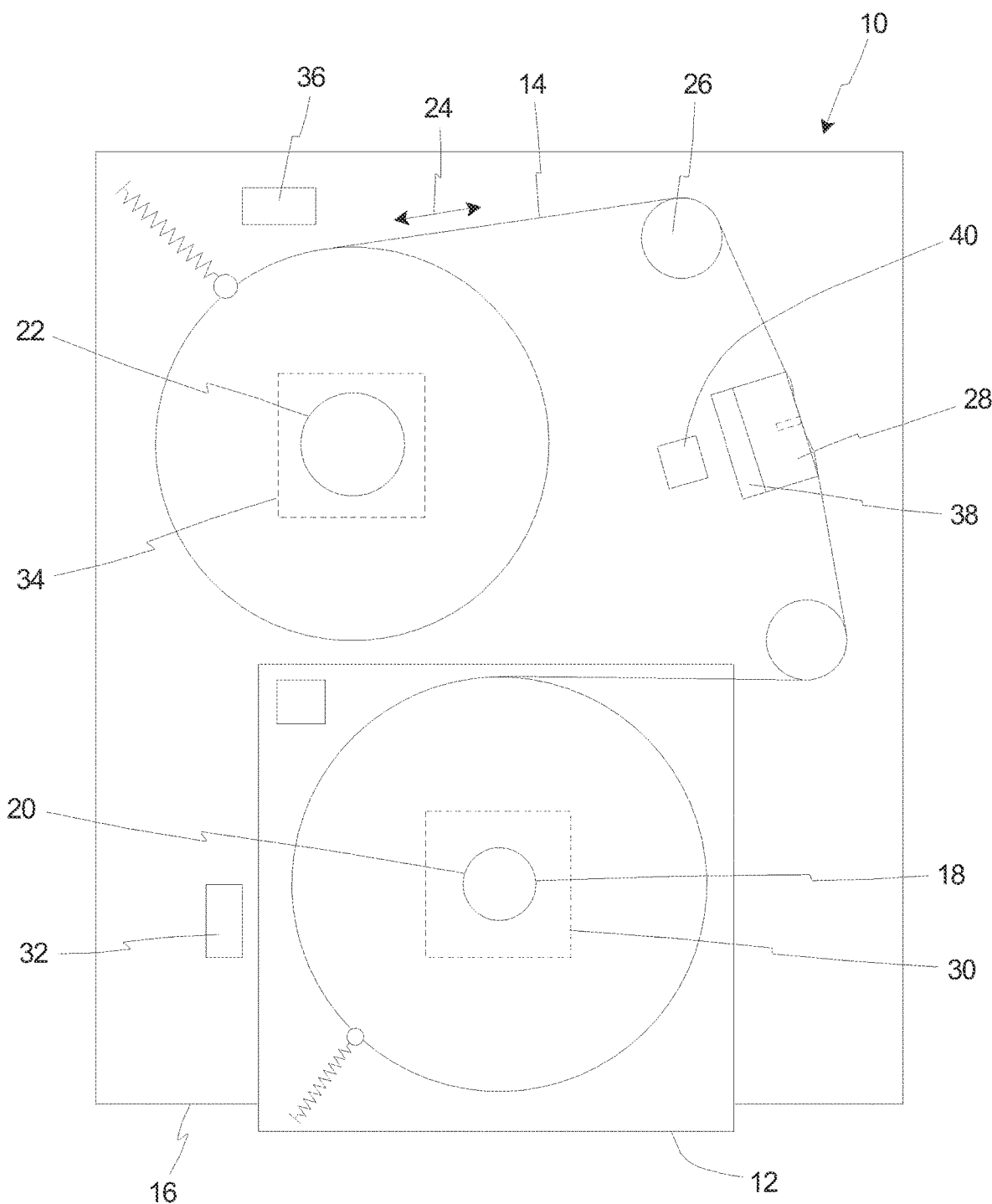
FIG. 1 is a simplified schematic top view illustration of a tape drive having features of the present invention, and a tape cartridge that has been inserted into the tape drive, which can be included as part of a tape library system.

Embodiments of the present invention are described herein in the context of a system and method for using hierarchical hash check mechanisms, such as hash trees, or Merkle trees, along with written data quality for data integrity and durability verification such that the hashing-based end-to-end data integrity test, unlike current methods, does not require actual user data to be read by a host system (also sometimes referred to simply as a "host"). In cryptography and computer science, a hash tree or Merkle tree is a tree in which every leaf node is labeled with a cryptographic hash of a data block, and every non-leaf node is labeled with a cryptographic hash of the labels of its child nodes. Thus, hash trees, or Merkle trees, make it possible to verify the contents of large data structures quickly, securely, and efficiently. In such manner, hash trees, or Merkle trees, can be used to verify any kind of data stored, handled and transferred in and between computers, and can help ensure that data blocks received from one source to another are received undamaged and unaltered.

The hashing plus written data quality metadata are also included as part of a self-describing tape format for long-term data retention. More particularly, the present invention incorporates a unique way of combining hashing, fixity checks, tape drives operating in Protective Mode or Merkle trees, to solve a set of specific problems with a unique tape data allocation method which includes a different tape format. The concepts and/or advantages of the proposed idea can be summarized as follows:

1) Eliminate or, if not possible, minimize and/or inhibit unnecessary back-hitches or underruns by streaming tape during the fixity check process;
2) Perform fixity check for end-to-end data integrity without requiring reading the actual data from tape, as is done with current technology;
3) Use of Merkle trees or other similar hierarchical hashing concepts to correlate hash of records with the overall object or file hash such that the tape drive or host can identify hidden errors without requiring reading the entire user data;
4) Use minimal metadata to implement a host-based fixity check without actual data based on current tape drive SCSI command sets and operations;
5) Use of a single hash value to implement a fixity check where the overall data integrity fixity check process is done by the tape drive, where data is never sent back to the host, and the ability to do so using fixed size records regardless of the size of the actual user data;
6) Use of data quality metrics during initial write mode to establish a baseline where fixity check mode is either done after write or during periodic scans. Instant quality metrics captured in read mode are used to compare to the baseline quality metrics to predict data wear due to media degradation that may occur as a result of one or more of use, environmental conditions and ageing;
7) Develop and format metadata from the fixity check hashing algorithm and write quality baseline data for all record sets that form the actual user file or object and store these as the metadata record either at a special partition or using an index record at the end of the data on tape where this index record is updated as the data on tape changes or is updated; and
8) Ability to use inconsistencies that come from fixity checks to identify the record or records in error either due to data integrity or data quality issues. Moreover, in certain implementations, these can be rewritten on the same tape by appending to the current written section and updating the metadata record files as a new index record to identify the fact that certain records on tape have been rewritten.

In summary, the concept is to use the new end-to-end Merkle tree-based hash array generation with written data quality such that minimum data would be needed to verify archival data integrity and durability while requiring minimum system resources. The ultimate goal is to minimize back-hitches for the fixity check process and provide a fixity check that also includes data quality metrics. Unfortunately, increased back-hitches and related underruns may result in tape head wear acceleration especially when the system uses too many abrasive green media. As described, the present concept helps to minimize the need for reading the entire object or file for fixity check which typically results in too many back-hitch motions, underruns and high demand on system resources including I/O bandwidth.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic top view illustration of a magnetic tape drive 10 (also referred to herein simply as a "tape drive"), and a magnetic tape cartridge 12 (also referred to herein simply as a "tape cartridge") that has been inserted into the tape drive 10, which can be included as part of a tape library system. In FIG. 1, covers for the tape drive 10 and the tape cartridge 12 have been omitted for clarity so that the interior of such components is visible. As shown, the tape cartridge 12 is configured to retain a magnetic tape 14. It is appreciated that the tape drive 10 as shown in FIG. 1, in certain aspects, represents a generic tape drive in terms of overall size, shape and design, and is shown by way of example and not by way of limitation. In some embodiments, the tape drive 10 operates in compliance with an LTO specification, such as LTO-8 or LTO-9. Stated in another manner, in such embodiments, the tape cartridge 12 is an LTO-compatible tape cartridge. In various embodiments, the magnetic tape 14 can be formatted in accordance with the teachings provided herein to better enable the desired hashing-based end-to-end data quality integrity testing system.

During use of the tape drive 10, the tape cartridge 12 is inserted into a drive housing 16 of the tape drive 10 so that the tape drive 10 can read data from and/or write data to the tape cartridge 12. As shown, the tape cartridge 12 includes a cartridge reel 18 that includes and/or defines a cartridge hub 20. The magnetic tape 14 is spooled about the cartridge hub 20 of the cartridge reel 18. In certain embodiments, the magnetic tape 14 can include at least one servo track (not shown) and a plurality of data tracks (not shown) that run along a longitudinal length of the magnetic tape 14. Each of these tracks can be positioned substantially parallel to each other.

The tape cartridge 12 supplies the magnetic tape 14 to the tape drive 10. More particularly, when the tape cartridge 12 is inserted into the drive housing 16 of the tape drive 10, one end of the magnetic tape 14 is taken up within the tape drive 10 to be wrapped around a drive reel 22 included in the tape drive 10. The magnetic tape 14 traverses a predefined path 24 (illustrated as a two-headed arrow) between the cartridge reel 18 and the drive reel 22, which is defined, at least in part, by one or more rollers 26 (two are shown in FIG. 1) positioned at strategic positions along the predefined path 24. The rollers 26 may also aid in limiting gross lateral movement (i.e. in and out of the page as shown in FIG. 1) of the magnetic tape 14, i.e. lateral tape motion or "LTM" in short.

Along the predefined path 24, the drive reel 22 moves the magnetic tape 14 across a tape head assembly 28 (also sometimes referred to herein as a "head assembly", "tape heads" or simply as a "head") that is configured to read data from and/or write data to the magnetic tape 14. In alternative embodiments, the head assembly 28 can include at least one read head, at least one write head, and at least one read/write head. In particular, the head assembly 28 is positioned in close proximity to the predefined path 24 of the magnetic tape 14 such that as the magnetic tape 14 travels in the longitudinal direction (by being wound from the cartridge reel 18 to the drive reel 22 or vice versa) the head assembly 28 can read/write data to particular tracks and longitudinal positions of the magnetic tape 14. Additionally, the head assembly 28 and/or a separate head assembly can include one or more servo elements configured to read the servo track(s) of the magnetic tape 14 in order to effectively maintain proper alignment between the head assembly 28 and the magnetic tape 14. It is appreciated that the tape drive 10 can include any suitable number of tape heads within the head assembly 28 for purposes of reading data from and/or writing data to the magnetic tape 14. For example, in one non-exclusive embodiment, the head assembly 28 can include 32 heads for purposes of reading data from and/or writing data to 32 data tracks on the magnetic tape 14.

In some embodiments, as shown, the tape drive 10 can also include a cartridge reel motor 30 (illustrated as a box in phantom) that generates the necessary force to rotate the cartridge reel 18 at will, and a cartridge reel encoder 32, e.g., a sensor or detector, that is configured to output signals representing the pulse rate (or rotation rate) of the cartridge reel motor 30. Additionally, the tape drive 10 can further include a drive reel motor 34 (illustrated as a box in phantom) that generates the necessary force to rotate the drive reel 22 at will, and a drive reel encoder 36, e.g., a sensor or detector, that is configured to output signals representing the pulse rate (or rotation rate) of the drive reel motor 34.

As illustrated in this embodiment, the tape drive 10 also includes an actuator 38 and a drive controller 40, including one or more processors and circuits, that can be communicatively coupled to the head assembly 28. The actuator 38 is configured to control the lateral position of the head assembly 28 and/or the individual heads of the head assembly 28 relative to the magnetic tape 14 based on a signal provided by the drive controller 40. As such, the actuator 38 comprises a mechanical positioner to move the head assembly 28 up or down laterally. By controlling the lateral position of the head assembly 28 relative to the magnetic tape 14, particular tracks of the magnetic tape 14 can be accessed as desired. Alternatively, the tape drive 10 can include more than one actuator 38. For example, the tape drive 10 can include a separate actuator 38 for each head.

The drive controller 40 is in communication with the actuator 38 and a number of other components within the tape drive 10. For example, although not specifically shown in FIG. 1, each of the cartridge reel motor 30, the cartridge reel encoder 32, the drive reel motor 34, and the drive reel encoder 36 can be in communication with the drive controller 40. As such, the drive controller 40 can be configured to perform various specified operations, such as the proposed fixity check incorporating a data integrity check based on hashing and Merkle trees, either individually, or in combination with other software, hardware and/or firmware elements.

With the present invention, as described in various embodiments herein, several key features are identified for use within a fixity check process. In particular, there are at least three distinct methods that have been identified, which can be useful in the proposed fixity check, and which can incorporate a data integrity check based on hashing and Merkle trees.

For example, in one representative embodiment of the present invention, N records can be hashed (with any hash function such as MD5 or SHA-1) in an embedded fashion. In this scheme, records are treated as ordered sets of data. In such an order, a record is identified with an index: $1^{st}$ record, $2^{nd}$ record, etc. In embedded hashing, a hash function accepts a 0 initialization and the 1st record to generate a hash value of N bits. Then, the same function is used but this time the inputs are set to the hash of the first record as initialization and the $2^{nd}$ record to generate the next hash value of M bits. The process continues as described until all of the records have been processed. As a result, the embedded hashing produces N hash values of M bits, for a total of MN bits. The last hash value of N bits is equivalent to the hash value of the entire file. All hash values are stored in the host as well as recorded to tape based on a prescribed format.

In one representative use of such method, suppose it is desired to check the integrity of the i-th record. In this case, the hash value generated is received that includes the (i−1)th record and the i-th record and regenerates the hash value. If the regenerated hash value matches the one stored on tape, the verification can be completed. In the case of verifying also the j-th record with j>i, then the drive reads records i, i+1, . . . , j and computes hashes the same way they are generated and compares the j-th hash with the version of the host's to complete the verification process.

In an alternative formulation hash trees can be used. A hash tree, also known as a Merkle tree, is a tree in which every leaf node is labeled with the cryptographic hash of a data block and every non-leaf node is labeled with the cryptographic hash of its child nodes' labels. Hash trees make it possible to verify the contents of huge data structures quickly and securely. An example Merkle tree is shown in FIG. 3A where eight records are used and 15 different hash calculations tied together in a special structure to ease the verification process. The creation and general use of such a Merkle tree is described in detail in FIG. 2.

Figure 2:
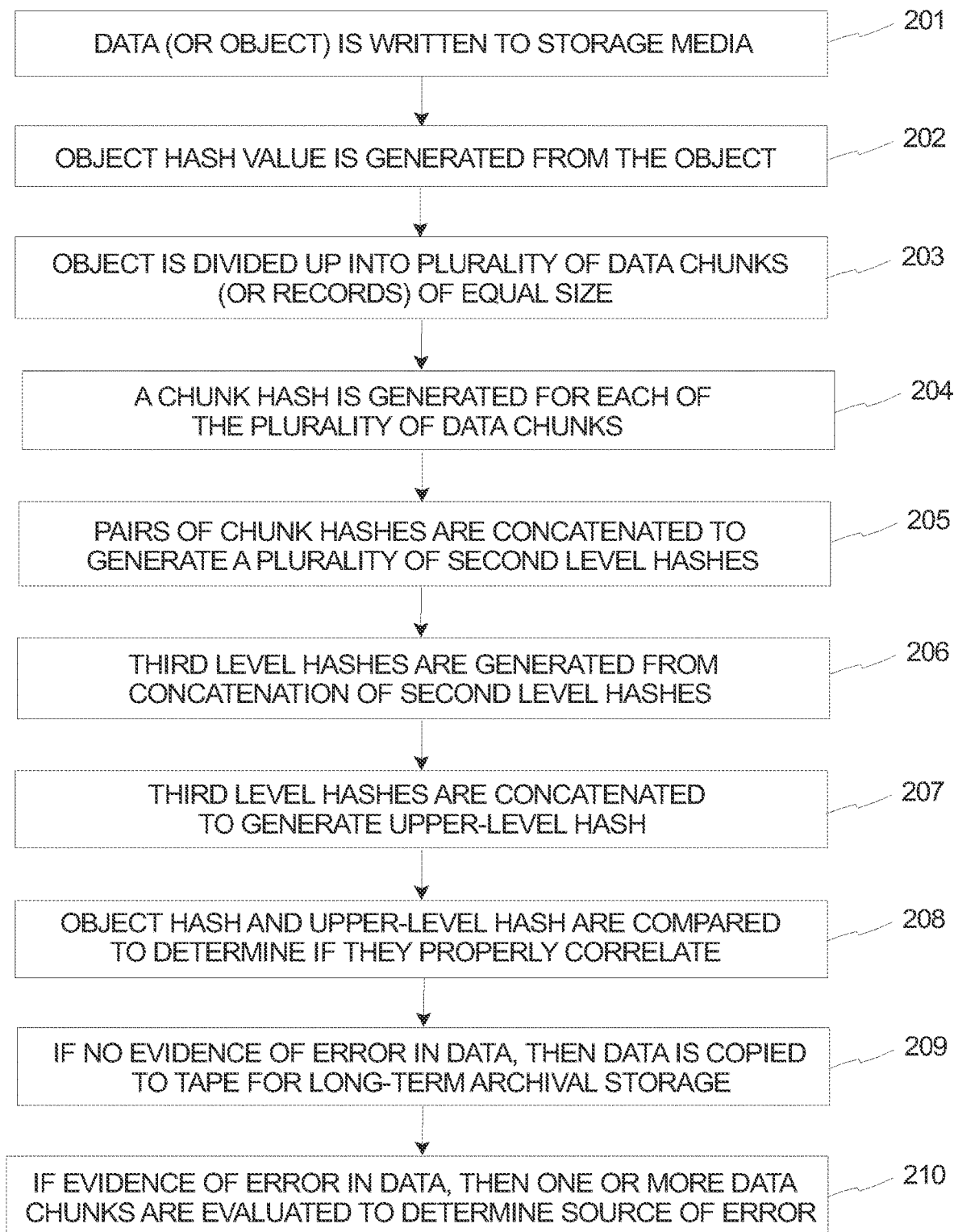
FIG. 2 is a simplified flowchart illustrating one method of use of a data quality integrity testing system having features of the present invention.
Figure 3A:
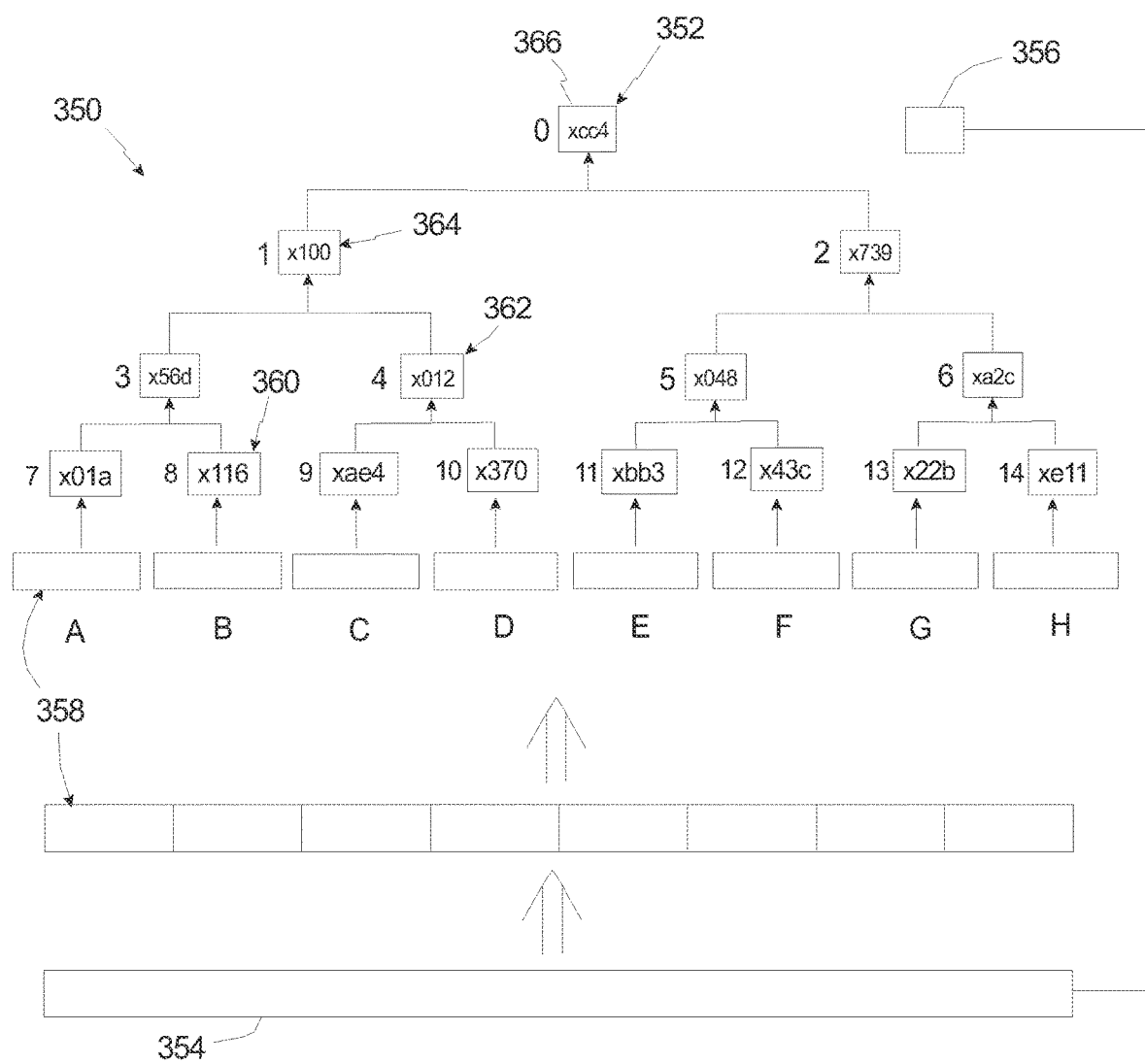
FIG. 3A is a simplified illustration of an embodiment of a hierarchical tree with accompanying hash structure usable as part of the data quality integrity testing system illustrated in FIG. 2.

FIG. 2 is a simplified flowchart illustrating one method of use of a data quality integrity testing system (also sometimes referred to simply as a "testing system") having features of the present invention. More particularly, in various embodiments, the data quality integrity testing system implements a host-based end-to-end fixity check on user data using minimum system resources.

In certain implementations, it is appreciated that the various steps described in relation to FIG. 2 can be modified, combined, and/or reordered, or certain steps can be omitted or more steps added without deviating from the intended breadth and scope of the present invention.

FIG. 3A is a simplified illustration of an embodiment of a hierarchical tree 350 (also sometimes referred to herein as a "hash tree" or "Merkle tree") with accompanying hash structure 352 usable as part of the data quality integrity testing system illustrated in FIG. 2. In an embodiment of the present invention, the host may compute the same tree of hashes using the same hash function. The hash values are indexed as shown in FIG. 3A for an eight-record file storage.

Referring back to FIG. 2, at step 201, data is written to storage media. The data written to the storage media can also sometimes be referred to as an "object". It is appreciated that the object or file can be of any size. The object 354 is illustrated as a box in FIG. 3A.

At step 202, an object hash value, or "object hash", is generated from the object. The object hash 356 is illustrated in FIG. 3A. The term hash value refers to a piece of data given as the answer to a hash function. Hash functions, or hash algorithms, perform the operation of turning a large set of data into a smaller set which represents the full set.

At step 203, the object is divided up into a plurality of data chunks 358 (or "records", illustrated in FIG. 3A) of equal size (equal number of bytes). For example, in one non-exclusive embodiment, as shown in FIG. 3A, the object can be divided up into eight data chunks 358 of equal size. In such embodiment, the data chunks 358 can include a first data chunk (labeled as Chunk "A" in FIG. 3A), a second data chunk (labeled as Chunk "B" in FIG. 3A), a third data chunk (labeled as Chunk "C" in FIG. 3A), a fourth data chunk (labeled as Chunk "D" in FIG. 3A), a fifth data chunk (labeled as Chunk "E" in FIG. 3A), a sixth data chunk (labeled as Chunk "F" in FIG. 3A), a seventh data chunk (labeled as Chunk "G" in FIG. 3A), and an eighth data chunk (labeled as Chunk "H" in FIG. 3A). It is appreciated that in certain implementations, the last data chunk (i.e. the eighth data chunk in this particular example), may be padded to ensure that all data chunks 358 are of equal size. In alternative implementations, the data chunks need not be padded.

For a typical manner in which the host writes user files or objects to magnetic tape, it is appreciated that the object 354 can be divided up into any suitable number of data chunks 358 of a similar fixed size. Typical record sizes are 256 KB, 512 KB or potentially 1 MB. Although larger record sizes are allowed by tape format such as Linear Tape Open (LTO), applications typically use smaller sizes. So, for a given file such as 5 GB one may have 5000 1 MB data chunks where the last one may be padded by zeros to comply with the required size for the data chunks 358. These data chunks 358 can be streamed to a tape drive, such as the tape drive 10 illustrated in FIG. 1, in a controlled manner so the tape drive 10 can receive them, put it into a format, and write each data chunk 358 onto the tape 14 (illustrated in FIG. 1).

In steps 204-207 in this embodiment, a hash tree 350 (illustrated in FIG. 3A), or Merkle tree, is generated from the plurality of data chunks 358 that were created from the object 354. It is appreciated that the number of such steps required to generate the Merkle tree 350 can be greater than or less than what is shown herein depending on the number of data chunks 358 into which the object 354 was divided, and the corresponding number of levels or layers of hash values generated within the Merkle tree 350.

At step 204, a chunk hash 360 (illustrated in FIG. 3A) is generated for each of the plurality of data chunks 358. More particularly, a first chunk hash 360 (labeled as hash "7" in FIG. 3A) is generated for the first data chunk 358, a second chunk hash 360 (labeled as hash "8" in FIG. 3A) is generated for the second data chunk 358, a third chunk hash 360 (labeled as hash "9" in FIG. 3A) is generated for the third data chunk 358, a fourth chunk hash 360 (labeled as hash "10" in FIG. 3A) is generated for the fourth data chunk 358, a fifth chunk hash 360 (labeled as hash "11" in FIG. 3A) is generated for the fifth data chunk 358, a sixth chunk hash 360 (labeled as hash "12" in FIG. 3A) is generated for the sixth data chunk 358, a seventh chunk hash 360 (labeled as hash "13" in FIG. 3A) is generated for the seventh data chunk 358, and an eighth chunk hash 360 (labeled as hash "14" in FIG. 3A) is generated for the eighth data chunk 358.

Tape drives 10, such as those operating in compliance with an LTO specification, have a built-in mode that uses "Protected Records", which means each data chunk 358 comes with CRC information generated by the host software. The idea is to use this chunk hash 360 information to test if the data chunk 358 is received correctly from the host before the tape drive is used to write the data chunks 358 to the tape 14.

At step 205, at least two, e.g., pairs of, chunk hashes 360 are concatenated to generate a plurality of second level hashes 362 (illustrated in FIG. 3A). In particular, in this embodiment, the first chunk hash and the second chunk hash are concatenated to generate a first, second level hash 362 (labeled as hash "3" in FIG. 3A), the third chunk hash and the fourth chunk hash are concatenated to generate a second, second level hash 362 (labeled as hash "4" in FIG. 3A), the fifth chunk hash and the sixth chunk hash are concatenated to generate a third, second level hash 362 (labeled as hash "5" in FIG. 3A), and the seventh chunk hash and the eighth chunk hash are concatenated to generate a fourth, second level hash 362 (labeled as hash "6" in FIG. 3A). Stated in another manner, in this embodiment, each of the second level hashes 362 is generated from concatenation of at least two chunk hashes.

At step 206, each of the third level hashes 364 are generated from concatenation of at least two, e.g., pairs of, the second level hashes 362. More specifically, in this embodiment, the first, second level hash and the second, second level hash are concatenated to generate a first, third level hash 364 (labeled as hash "1" in FIG. 3A), and the third, second level hash and the fourth, second level hash are concatenated to generate a second, third level hash 364 (labeled as hash "2" in FIG. 3A). Stated in another manner, in this embodiment, each of the third level hashes 364 is generated from concatenation of at least two second level hashes.

At step 207, the third level hashes 364 are concatenated to generate an upper-level hash 366 (labeled as hash "0" in FIG. 3A). More particularly, in this embodiment, the first, third level hash and the second, third level hash are concatenated to generate the upper-level hash 366. Stated in another manner, the upper-level hash 366 is generated from concatenation of at least two lower-level hashes, such as hashes generated in the level immediately below the upper-level hash.

At step 208, the object hash 356 and the upper-level hash 366 are compared to one another to determine if they properly correlate with one another such that there is no evidence of error within the data.

If there is no evidence of error in the data, then at step 209, the data is copied to a tape for purpose of long-term archival storage.

However, if there is evidence of error in the data, then at step 210, one or more of the data chunks are evaluated to determine the source of the error.

Figure 3B:
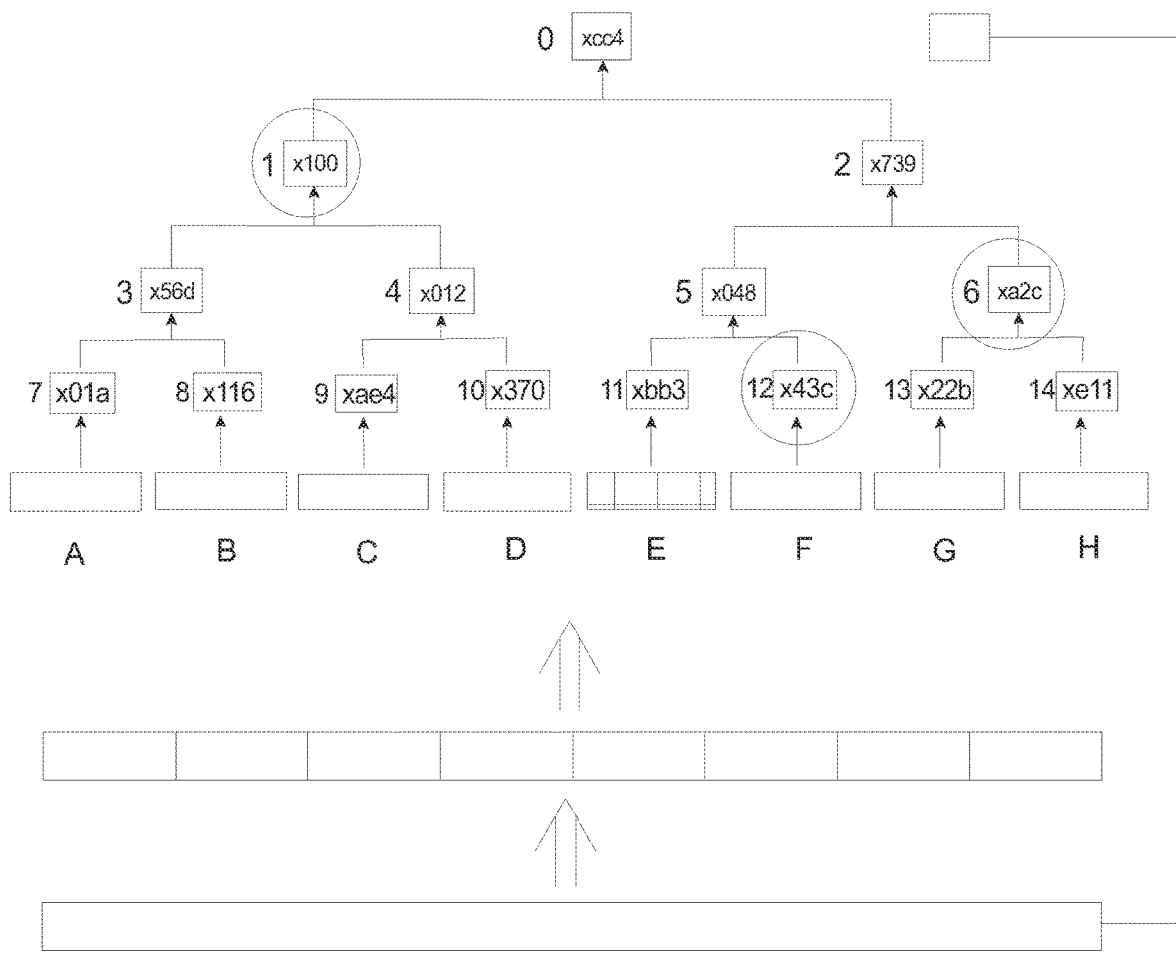
FIG. 3B is a representative example of a usage of the hierarchical tree with accompanying hash structure of FIG. 3A to check data quality integrity of a data chunk within the hierarchical tree.

FIG. 3B is a representative example of a usage of the hierarchical tree with accompanying hash structure of FIG. 3A to check data quality integrity of a data chunk within the hierarchical tree. As noted above, all hash values are stored in the host as well as recorded to tape based on a prescribed format.

As shown in FIG. 3B, it is appreciated that in order to check the integrity of any individual data chunk, it is necessary to use three hashes in the hierarchical tree. Stated in another manner, to check the integrity of the i-th record, the hash value for such record is computed, and three other hashes are used to compute the top hash value, which is provided by the host to check if the verification passes right. For example, if it was desired to check the integrity of the fifth data chunk (filled in with a crisscross pattern, and labelled as data chunk "E"), the sixth chunk hash (circled, and labelled as hash "12"), the fourth, second level hash (circled, and labelled as hash "6"), and the first, third level hash (circled, and labelled as hash "1"), which have been stored and recorded to tape as part of the noted formatting of the tape, need to be used. More specifically, as shown in the hierarchical tree, if there is evidence of error in the data based on the comparison of the object hash and the upper-level hash, then if the sixth chunk hash ("12"), the fourth, second level hash ("6"), and the first, third level hash ("1") all test positively for integrity, then it is confirmed that there is a source of error in the fifth data chunk ("E"). In particular, knowing that there is overall error in the upper-level hash, working downward, if there is no error in the first, third level hash, then there must be error within the second, third level hash. Subsequently, if there is error within the second, third level hash, and there is no error in the fourth, second level hash, then there must be error within the third, second level hash. Finally, if there is error within the third, second level hash, and there is no error within the sixth chunk hash, then there must be error within the fifth data chunk.

It is appreciated that typically all of the hashes are stored so it can be immediately known if there is an error in the fifth data chunk (data chunk "E") by knowing the sixth chunk hash ("12") and the third, second level hash ("5"). However, most implementations do a comparison of the upper-level hash ("0") because it is understood that the error propagates up to the top of the hierarchical tree. Stated in another manner, if there is an error in the fifth data chunk "E"), then the hash value for hashes "11", "5", "2" and "0" will be different than the one without error.

Figure 3C:
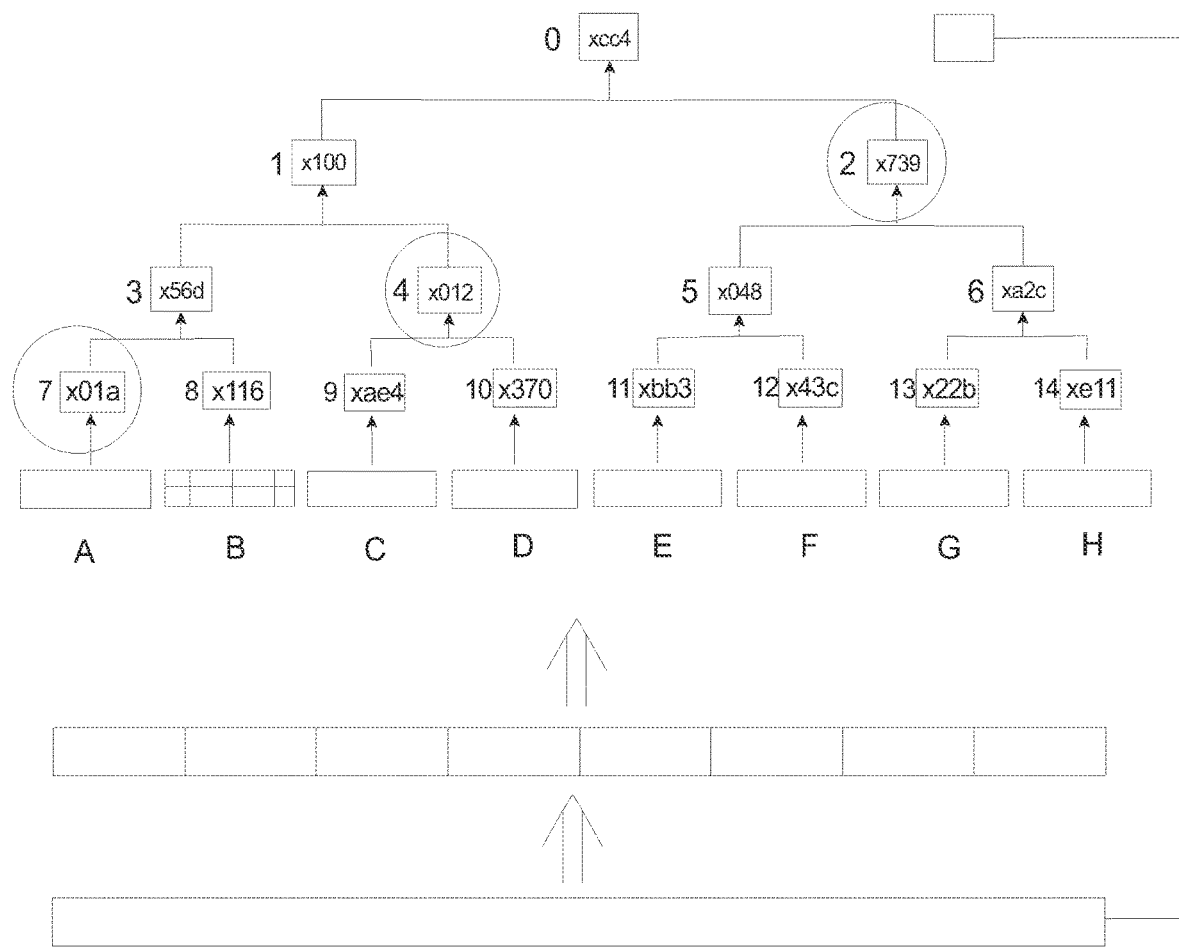
FIG. 3C is another representative example of a usage of the hierarchical tree with accompanying hash structure of FIG. 3A to check data quality integrity of another data chunk within the hierarchical tree.

FIG. 3C is another representative example of a usage of the hierarchical tree with accompanying hash structure of FIG. 3A to check data quality integrity of another data chunk within the hierarchical tree. In particular, as shown in FIG. 3C, if it was desired to check the integrity of the second data chunk (filled in with a crisscross pattern, and labelled as data chunk "B"), the first chunk hash (circled, and labelled as hash "7"), the second, second level hash (circled, and labelled as hash "4"), and the second, third level hash (circled, and labelled as hash "2"), which have been stored and recorded to tape as part of the formatting of the tape, need to be used. More specifically, as shown in the hierarchical tree, if there is evidence of error in the data based on the comparison of the object hash and the upper-level hash, then if the first chunk hash ("7"), the second, second level hash ("4"), and the second, third level hash ("2") all test positively for integrity, then it is confirmed that there is a source of error in the second data chunk ("B"). In particular, knowing that there is overall error in the upper-level hash, working downward, if there is no error in the second, third level hash, then there must be error within the first, third level hash. Subsequently, if there is error within the first, third level hash, and there is no error in the second, second level hash, then there must be error within the first, second level hash. Finally, if there is error within the first, second level hash, and there is no error within the first chunk hash, then there must be error within the second data chunk.

Figure 3D:
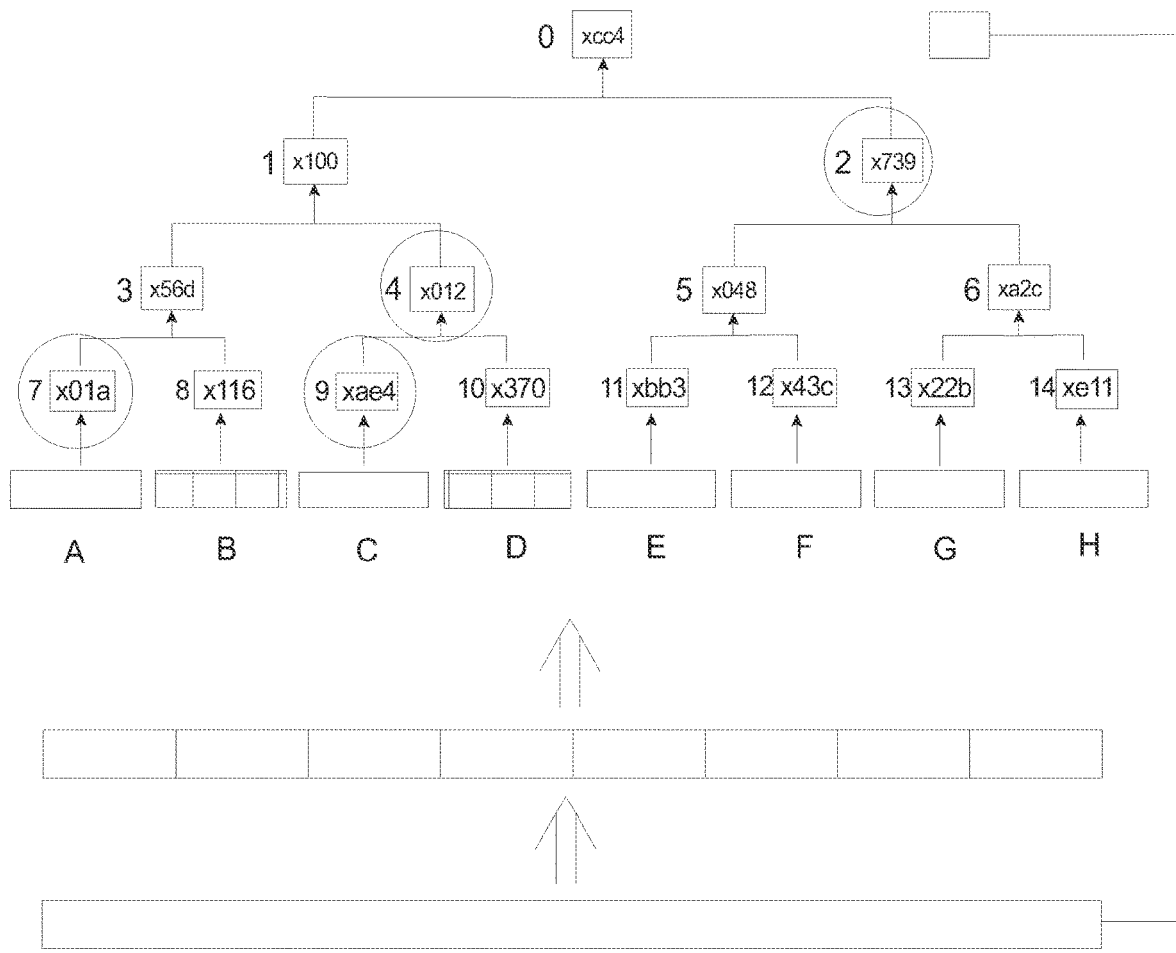
FIG. 3D is still another representative example of a usage of the hierarchical tree with accompanying hash structure of FIG. 3A to check data quality integrity of two data chunks within the hierarchical tree.

FIG. 3D is still another representative example of a usage of the hierarchical tree with accompanying hash structure of FIG. 3A to check data quality integrity of two data chunks within the hierarchical tree. As shown in FIG. 3D, it is appreciated that in order to check the integrity of any two individual data chunks, it is necessary to use four hashes in the hierarchical tree, which have been stored and recorded to tape as part of the formatting of the tape. For example, if it was desired to check the integrity of the second data chunk (filled in with a crisscross pattern, and labelled as data chunk "B") and the fourth data chunk (filled in with a crisscross pattern, and labelled as data chunk "D"), (i) the first chunk hash (circled, and labelled as hash "7"), (ii) the third chunk hash (circled, and labelled as hash "9"), (iii) the second, second level hash (circled, and labelled as hash "4"), and (iv) the second, third level hash (circled, and labelled as hash "2") can be used to determine if there are any hidden errors in the second data chunk or the fourth data chunk. It is appreciated that unlike the embedded hashing described above, the process does not need to read the third data chunk (labelled as data chunk "C"), which could otherwise reduce the processing speed and create a bottleneck in the later stages of the storage.

Unlike the single error case, in this scenario, it is first necessary to identify if there is any error by comparing/communicating the upper-level hash. Subsequently, moving down the hierarchical tree, the data quality integrity testing system can identify which chunks are problematic by executing appropriate hash comparisons. For example, as shown, the third chunk hash ("9") and the second, second level hash ("4") can be used to identify the error in the fourth data chunk ("D"). Also, the first chunk hash ("7"), the second, second level hash ("4"), and the second, third level hash ("2") can be used to identify the error in the second data chunk ("B"). It is appreciated that compared to the single error case, one more hash value can be used to be able to identify one more erroneous data chunk.

Figure 3E:
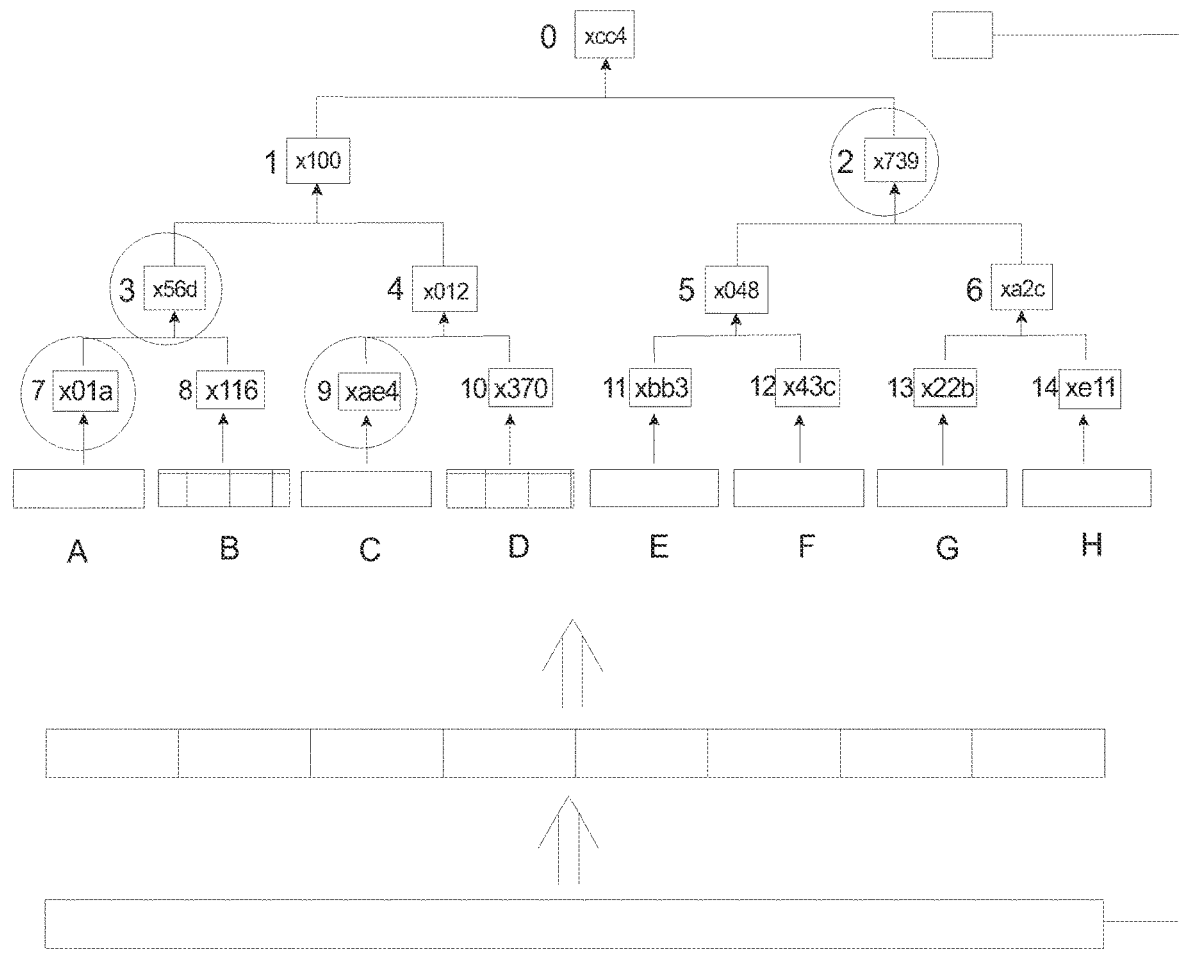
FIG. 3E is an alternative representative example of a usage of the hierarchical tree with accompanying hash structure of FIG. 3A to check data quality integrity of the two data chunks within the hierarchical tree as in FIG. 3D.

FIG. 3E is an alternative representative example of a usage of the hierarchical tree with accompanying hash structure of FIG. 3A to check data quality integrity of the two data chunks within the hierarchical tree as in FIG. 3D. As shown in Figure E, if it was desired to check the integrity of the second data chunk (filled in with a crisscross pattern, and labelled as data chunk "B") and the fourth data chunk (filled in with a crisscross pattern, and labelled as data chunk "D"), alternatively (i) the first chunk hash (circled, and labelled as hash "7"), (ii) the third chunk hash (circled, and labelled as hash "9"), (iii) the first, second level hash (circled, and labelled as hash "3"), and (iv) the second, third level hash (circled, and labelled as hash "2") can be used. It is appreciated that, in this implementation, the system and method for checking the integrity of the second and fourth data chunks ("B", "D") is similar to what was described in relation to FIG. 3D.

Figure 3F:
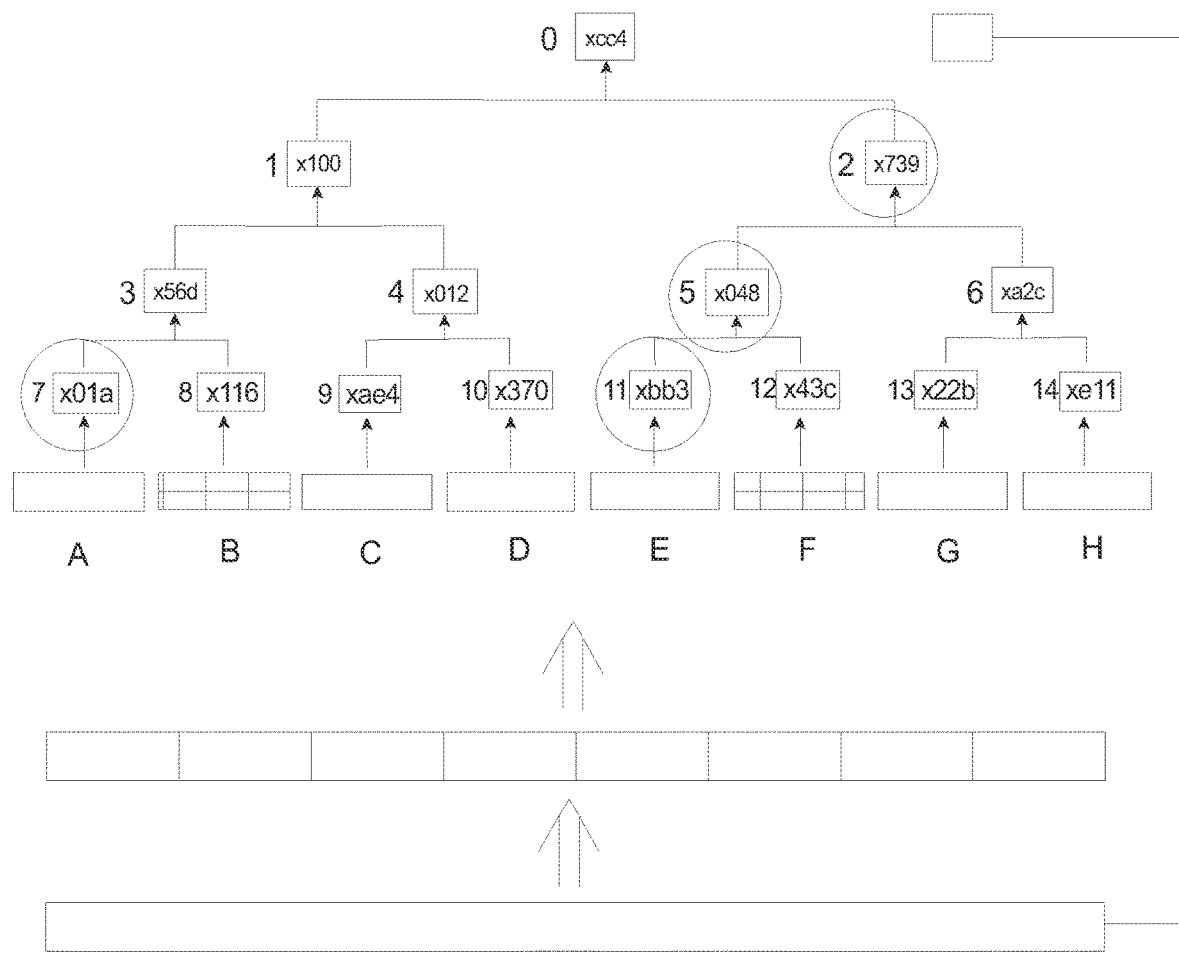
FIG. 3F is yet another representative example of a usage of the hierarchical tree with accompanying hash structure of FIG. 3A to check data quality integrity of two data chunks within the hierarchical tree.

FIG. 3F is yet another representative example of a usage of the hierarchical tree with accompanying hash structure of FIG. 3A to check data quality integrity of two data chunks within the hierarchical tree. As shown in FIG. 3F, if it was desired to check the integrity of the second data chunk (filled in with a crisscross pattern, and labelled as data chunk "B") and the sixth data chunk (filled in with a crisscross pattern, and labelled as data chunk "F"), (i) the first chunk hash (circled, and labelled as hash "7"), (ii) the fifth chunk hash (circled, and labelled as hash "11"), (iii) the third, second level hash (circled, and labelled as hash "5"), and (iv) the second, third level hash (circled, and labelled as hash "2") can be used. It is again appreciated that, in this implementation, the system and method for checking the integrity of the second and sixth data chunks ("B", "F") is similar to what was described in relation to FIG. 3D.

In employing this second method, the host only keeps the top hash and shares it if requested. The tape will also have the top hash recorded in some partition.

It is appreciated that hash calculations involving records take more time in general. In Merkle tree-based hashing, only one hash function deals with a record. The rest of the hashing deals with two or more short M bit sequences.

In multiple record fixity checking, records that stay between intended records do not need to be read. However, independent hashing through the use of Merkle trees (without using initialization) leads to the storage of more hashes which are typically short size (M<<Record size).

It is further appreciated that in order to use either embedded hashing or Merkle tree-based hashing, this technique must be accompanied by a format where the hashes are stored as part of records. Considering the sequential read/write nature of the tape, allocation of records and hashes must be made intelligently.

In a third method, a hybrid-type scheme can be employed. The following is a representative example of how one can implement this concept for writing and fixity checking. Initially, in write mode, a user object or file is received with a Hash value (Object_Hash) that identifies the integrity of the object and this Object_Hash value will be used as data or object is moved from storage medium to different mediums including tape or tapes. The user's algorithm (and the associated inputs) to calculate the hash has to be agreed upon with the host.

Prior to writing, host software will generate N equal size records (last one maybe padded) and a hash value is generated for each one using the tape drive format protected mode such as CRC32 algorithm or other agreed on cryptographic hash function such as MD5 and SHA-1. In this example the Merkle tree concept is used such that each record has a local hash plus additional Merkel tree hashes that link these records to each other finally generating a single root tree hash.

To guard against any data integrity issues that might occur during the generation of the N equal size records, the hash value of the object or file will also be regenerated simultaneously based upon the algorithm the user utilized as the records are being assembled. This regenerated hash value will then be compared against the hash value received from the user. Performing this step on the fly should reduce processing time by taking advantage of the situations that records are already in memory thus eliminating additional memory access if this step is performed as a separate action.

Once the records and Merkel tree structure is established, the original Object_Hash is recomputed by using records in an organized structure such that the system can verify no hidden errors while generating records from the object such that writing record with a correct hash is developed. This is key to the operation. It is further noted that another method is to establish a protocol between the user and the host such that user can actually use the Merkle tree with a pre-agreed record size to develop a single Object Hash but based on N number of fixed K byte records. This way this single final hash can now be used to communicate between user and host as well as all subsequent host fixity checks.

After verification has been completed such as described, the entire set of hash values is stored, including the original object hash, object file name and record file names: Object_Hash and N record Merkle hash values, as part of metadata according to a predefined format for future use and end-to-end fixity check process.

Now the host software sends these N records each with their individual hash values to tape drive using Protective Mode with the tape drive executing the write as the format currently defines it.

Once the last record is written, the host will also send special metadata record(s) including the overall Merkle hash value with individual record numbers plus object identifier to the tape to identify the information for the preceding records. Note that this index record will have its own hash value, so it is also protected. Details of this are shown and described in relation to FIG. 4A and FIG. 4B.

Figure 4A:
FIG. 4A-4B is a simplified schematic illustration of an embodiment of a self-describing tape format with a built-in fixity check mechanism.
Figure 4B:
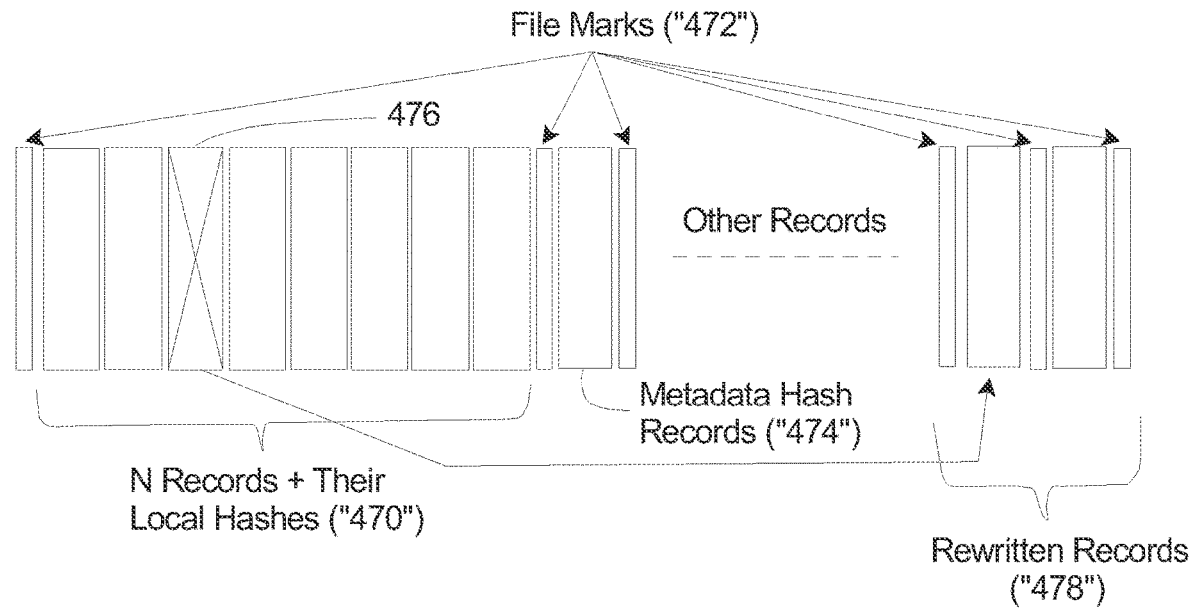

FIG. 4A-4B is a simplified schematic illustration of an embodiment of a self-describing tape format with a built-in fixity check mechanism.

FIG. 4A illustrates that within the tape format, there is a set of N records for an object, plus their local hashes. Such set of N records plus their local hashes is identified in FIG. 4A with reference number "470". FIG. 4A also illustrates certain file marks 472 that are embedded within the tape format. Also shown with reference number "474" is metadata hash record(s) with local hash value including Merkle tree hash, record and object id's object hash metadata record(s).

FIG. 4B illustrates the reformatting and/or updating of the tape when one or more errors are determined based on fixity check. As shown, FIG. 4B again illustrates the set of N records plus their local hashes ("470"), certain file marks 472, and the metadata hash records 474, such as were also shown in FIG. 4A.

Regarding tape format, assume the system determines that an X'ed Record 476 has an error based on fixity check. Through use of the present invention, rather than rewriting the entire object, which can be very large, the system only rewrites the error record with a new Metadata Record down the tape or other tapes with links to the original set of records. The rewritten fixity check error record(s) with updated metadata record(s) with links to the total set of records are illustrated in FIG. 4B with reference number "478".

Figure 5:
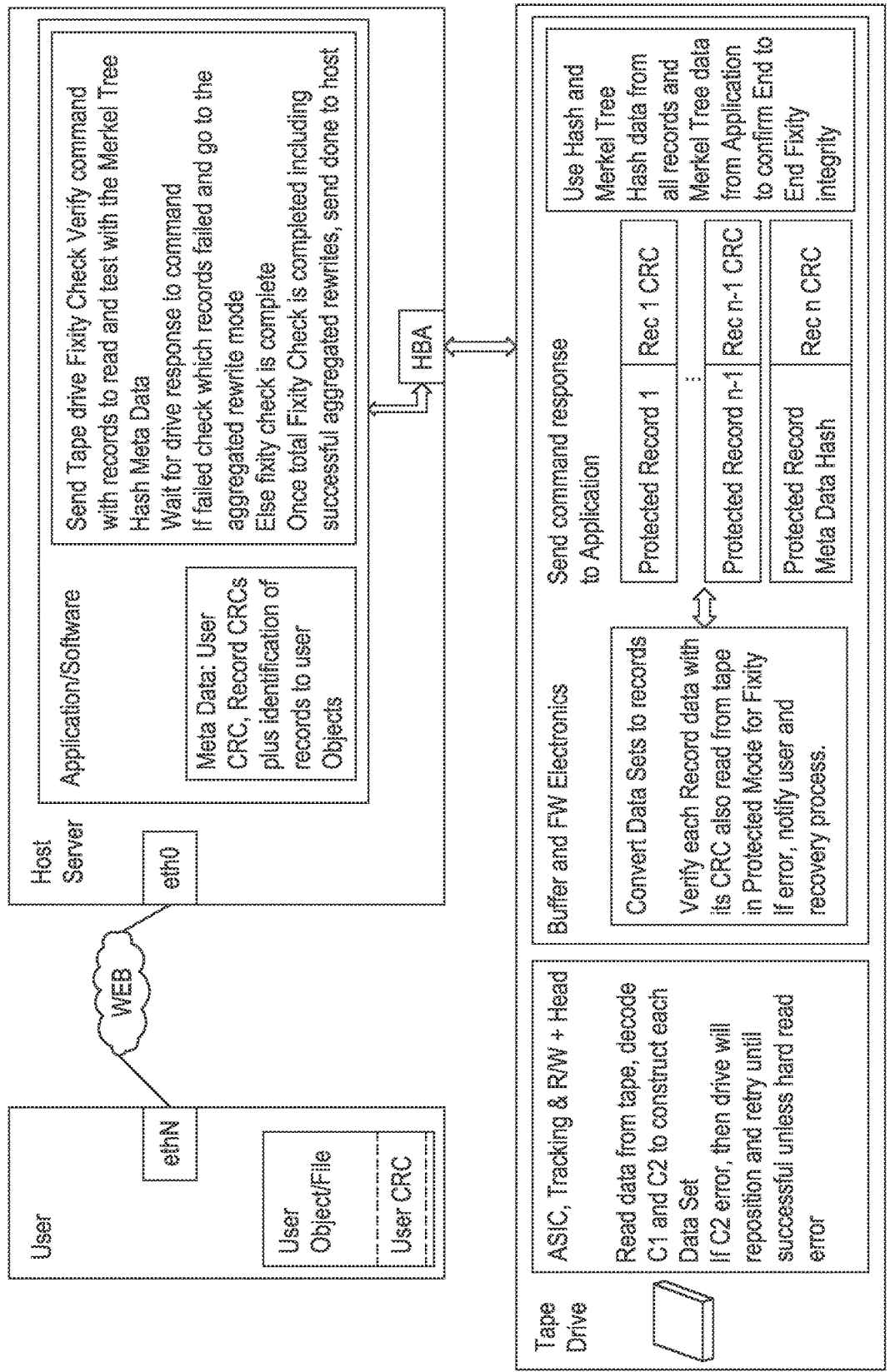
FIG. 5 is a simplified schematic system block diagram showing use of the data quality integrity testing system during fixity check read mode using protected records.

FIG. 5 is a simplified schematic system block diagram showing use of the data quality integrity testing system during fixity check read mode using protected records. More particularly, FIG. 5 illustrates the typical functions and operations for the user, the host server (including application/software), and the tape drive (including buffer and firmware electronics) during fixity check read mode using protected records.

When using the data quality integrity testing system during fixity check read mode using protected records, the goal is to read tape and execute fixity check using minimum data transfer from the tape drive to the host system such that the tape drive can stream at an optimum speed, minimizing back-hitch motions while the host and the tape drive jointly identify any hidden errors in the original user object or file including potential hash collusions.

Through use of the present inventive data quality integrity testing system, with a self-describing tape format as shown and described above, there are two options for how the desired fixity check is effectively implemented, each having different benefits. More particularly, the present inventive testing system can utilize current tape drive SCSI command-based fixity check, or a drive-based fixity check using a new SCSI command.

Initially, for a current tape drive SCSI command-based fixity check, the host will read records written to tape in protected mode, and as it reads data it will ignore data except the CRC/hash information that happens to be the Hash_Record bytes for each one of the N records which is the original user object. The tape drive reading records written in Protected Mode will use CRC verification to send back both records data and the calculated and verified CRC data for each record. Now, the host will have a very limited hash data for N records and does not need the actual large user data, making the task for the host easier. This would help with streaming the tape drive and reducing the back-hitches.

The host will use the original Merkle tree structure established during write mode and the N hash record CRC data read from the drive to calculate fixity check result. The host will be able to conform to which record is in error based on the Merkle tree structure as shown and described in relation to FIG. 3A. Due to Merkle tree hashing, the probability of collision is extremely low compared to the case where a single hash is used for one very large user object or file which is one of the key benefits of this method. In this case, we basically read from the tape drive only N hash values rather than the entire records making the overall object or file access times low, also resulting in very low I/O usage and enabling drive full streaming and minimizing back-hitches.

In the alternative mode implementing a drive-based fixity check using new SCSI command, a new SCSI command is required that currently does not exist that is full object or file-based complete fixity check all done by the tape drive. So, there is no communication between the host and the tape drive except for a SCSI command and command done reply in between. The tape drive will read records in Protected Mode and compute hashes and make sure each record is correct using current Protected Mode read process. While doing this, no data will be sent back to the host.

As each record is confirmed, the tape drive will only keep the individual hash and record ID's until the last record is read as it is known by the metadata and it will use the record hash plus Merkel tree hash values such as shown above to be able to verify the final Merkel tree hash number. If it confirms, it will send the host command-done response with the final Merkel tree root hash value.

As described, when silent record errors are uncovered, they need to be rewritten. Using the present inventive data quality integrity testing system, recovery and rewriting can be done by the aggregated record rewrite method as shown in FIGS. 4A and 4B.

Although the current method can be used, it is appreciated that the new aggregated method will minimize tape use, head wear and result in faster operations. Thus, recovery from the records error during read verify may employ one of the following methods:

Current Method: Rewrite the backup set in its entirety by locating the beginning of the back-up set, and then use the overwrite append method to re-write the backup set. The disadvantage of this method is that it adds more backup-verify time and more tape passes.

Aggregation method: The collected error record(s) shall be rewritten at the end of the backup set. The host must indicate in the metadata that the repeated records are at the new locations. The advantage for this method is less backup-verify time and less tape passes compare to the current method. The disadvantage is that the application client must be able to re-construct the data file in the out-of-order sequence.

A sample performance example is described utilizing sample performance data comparing current fixity check by Read-Optimized Fixity as described herein. Using an LTO-8 HH drive write two wraps of 2 GB data objects where record size is selected to be 512K. The goal is to check every 2 GB object for fixity by reading each and running a CRC32 hash check. Based on LTO-8 format, two wraps will have min 57 2 GB objects written. The result of reading and executing CRC32 and repeating this for all 57 objects is as follows: (i) Read two wraps of data; (ii) For 2 GB data, average CRC32C (a hash function used in current system) calculation time on host server is estimated to be 7.2 seconds; and (iii) 57 2 GB objects requires 1785 meter per min tape including rewrites which in this case is known to be less than 1.2%.

However, it is understood that while reading data into the local drive buffer while the host server is retrieving data from the drive buffer, the tape drive does back-hitches with the drive buffer being full while the host is executing CRC checks. The result of these back-hitches is the loss of performance and extra tape motion with a high number of deceleration and acceleration motions. Thus, in such performance example, total overhead tape motion for reading two wraps of 2 GB objects required 2600-meters tape motion. This will result in 45% extra tape motion with a completion time of 15 minutes. The reading of two wraps of data with LTO-8 HH drive where max transfer rates are around 300 MB/s will be 6.3 minutes. The 15 minutes vs 6.3 minutes difference is due to the back-hitches, which in this case was measured to be 57 times.

Conversely, experimentation with the proposed method showed substantial improvements. More particularly, with the proposed read-optimized method, the system experienced no back-hitch motions, and was able to perform the desired object read using total tape motion of 1957 meters, which took approximately eight minutes. The eight minutes is somewhat slower than the ideal case taking only 6.3 minutes (and about 1785 meters tape motion), but it was significantly better than the approximately 15 minutes (and 2600 meters of tape motion) using the typical/conventional method.

Previous sections described the use of separate optimized read mode for fixity checks with a reading drive and host jointly managing CRC/hashing checks. However, writes and reads may be subject to various media and drive-related errors, including error rates that may hide the quality of the writes where the fixity checks may succeed, but quality of archived data may still be questionable not in terms of data integrity but archived durability. This section introduces a quality check which is done during writes and confirmed by reads to include a separate quality metric in addition to fixity checks so archived media has both correct user data with a durability to meet the long-term archival life.

Figure 6:
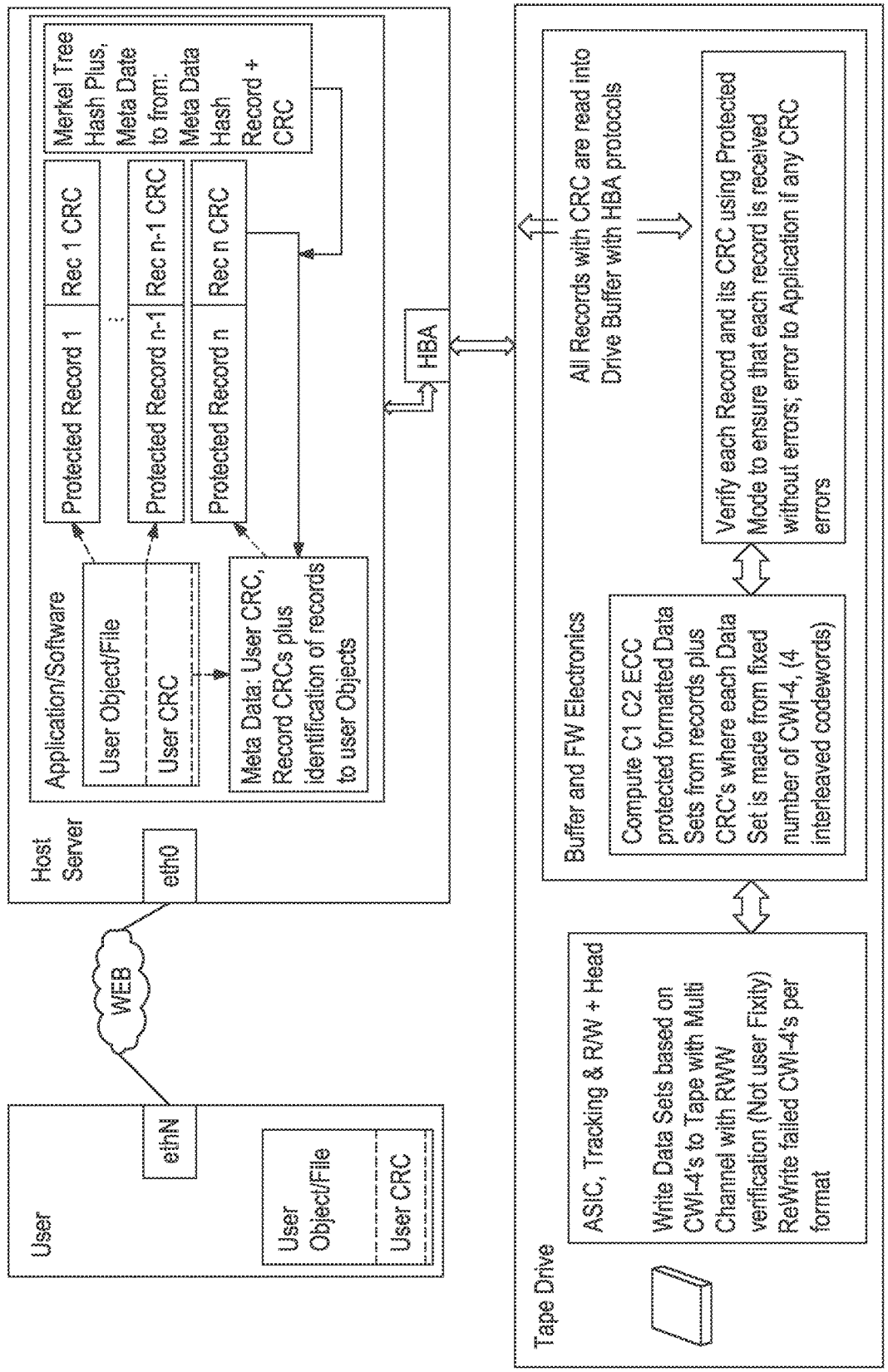
FIG. 6 is a simplified schematic system block diagram showing use of the data quality integrity testing system during write mode using protected records.

FIG. 6 is a simplified schematic system block diagram showing use of the data quality integrity testing system during write mode using protected records. More particularly, FIG. 6 illustrates the typical functions and operations for the user, the host server (including application/software), and the tape drive (including buffer and firmware electronics) during write mode using protected records. Stated in another manner, FIG. 6 illustrates the typical methodology for the present invention on write performance assisted fixity checks for end-to-end data integrity and durability. The illustrated methodology can include one or more of the following features, concepts or steps:

During writes, end-of-data (EOD) processing is used to synchronize or align records with LPOS and wrap numbers, where LPOS is Linear Position of tape measured with servo format on tape where typical resolutions is 5 mm.

Write metrics are collected using high resolution data capture plus LPOS and wrap numbers.

Write metrics data is processed to estimate the quality of writes even if the tape drive does not issue a hard write error.

Metadata is saved for record numbers, wrap and LPOS positions and write metrics as durability maps either on the tape or other locations or both.

Either the same or a different tape drive is used (preferably a different tape drive) to read to fixity check verification.

During reads, read mode metrics are used (rewrites are now defined as C2 ECC input error rates) to compare the quality of the written data by comparing them to the write mode metrics.

Finally, based on performance thresholds, the host can decide to rewrite or move data to another tape either during write or during read verify modes.

A sample performance example is described utilizing user records, data sets and write performance metric, for synchronization and/or alignment in use of the data quality integrity testing system in write mode. In particular, the following discussion includes an example of records and data set (tape format), and use of EOD to synchronize records and write metric as a function of LPOS and wrap numbers.

It is appreciated that each LTO format uses a specific size for data sets which is the basic building block (C1-C2 ECC formatted data chunks) where records are used to rebuild data sets before writing to tape. Since during write mode, C2 is skipped and C1 is used, the host cannot know if a record is totally written to tape unless the buffer is either flushed or emptied out with an EOD data set written at the end. Then, all the previous records are assumed to be written if no hard write errors are issued by the tape drive. This is the fundamental reason for doing a separate fixity check read verify as is described herein.

In an example embodiment, an LTO-8 data set size is approximately 5 MB. Assuming the use of a 100 MB overall record size, typically a record can have 20 individual user records. With 12 TB nominal user capacity and 208 wraps, LTO-8 wrap will have typically 59.6923 GB and 11,467 datasets and typically 573 user records per wrap.

If it is desired to collect write performance every 2 GB along the tape each wrap, this means there will be 28 data points per wrap and the longitudinal position by LPOS for a given wrap number will be known.

It is assumed that the host will force an EOD after writing minimum six wraps, which will typically be 358 GB user data records (3,438 100 MB records). After six wraps of writing, it will be known that these 3,438 100 MB records are written sequentially over these specific six wraps where the starting and ending positions are known by LPOS information.

At this point, the host has a record map on tape over the six wraps and also 28 write metrics data per wrap with known locations due to LPOS and wrap numbers. Now, the host can use these two maps to predict the durability of the actual data written on tape using the write metrics and decide if the data has to be rewritten to another tape or the same tape, and by the same tape drive or by a different tape drive.

Once the tape is written, the metadata for these two maps (record position and write metrics maps) can be stored either on the same tape or elsewhere in the system since these maps will be used for reads.

Now that six wraps have been written, they can be read to verify the data for write performance assisted fixity checks. With six wraps writing, the tracks have trimmed on one edge, trimmed on both edges (center of FWD and REV wraps) and last wrap in both directions untrimmed.

With the write metrics map, the ideal case can be utilized to determine if writing is good for deep archival such as for 10 or 30 years. It is also desired to make sure that fixity checks are good and also track trimming does not compromise data durability (using trimmed and untrimmed tracks in both directions using the six-wrap case).

This can be done by reading this recording preferably using a different tape drive so track trimming related data durability checks can support drive to drive variations. During reading, the same data can be collected (28 samples this time the read metrics) per wrap with LPOS and wrap numbers until EOPD is reached successfully. Once the 3,438 100 MB records are read with read metrics, the host can develop the read maps and compare these to write maps including record maps to estimate data durability, which the same host is also executing the fixity checks. This method will enable the host to execute a tape motion and time efficient fixity checks with data durability estimations using write and read mode performance metrics maps.

Various issues regarding performance metrics can also be discussed in light of the specific teachings provided herein. For example, when a tape drive writes to tape, various regions on the media may require higher rewrites, and these mostly are media defects assuming the heads are not affected by debris contamination. Head clogs and media debris characteristics, although both result in rewrites, both exhibit different profiles where clog-related rewrites are systematic media defects are random and typically have a floor to it. If one reads a tape written by the same or a different tape drive, rewrites in write mode now will show up as C2 ECC input errors. Since write rewrites all media imperfections, if the same region is read, even with the same tape drive, the C2 input errors will be extremely low since all defects are rewritten in the write pass. A high C2 input error in a region of tape (identified by LPOS and wrap number) where the tape drive had a high, rewrite rate may indicate potential media instability assuming there is no debris issue (debris-related issues can be isolated by using a different tape drive to read).

Tracking related issues that are correlated can also be identified using the write mode metrics. As an example, during writes, the host will collect off-track related events and their positions by LPOS and wrap. After writing multiple wraps, host-based algorithms can determine if the stop writes are positionally correlated longitudinally along the tape. By also checking the rewrites in the same region, one can correlate the tracking problems and rewrites being correlated with tape position. This can be used by the host to move the data to another tape since positionally correlated tracking errors are typically tape-related such as tape edge problems.

In summary, the system and method of the present invention enables end-to-end fixity check that utilizes minimum system resources. More particularly, with the use of the system and method of the present invention, the following concepts can be utilized and/or realized: (1) the host can implement fixity check with user data; (2) object to record conversion can be accomplished using a hierarchical multi-hash concept; (3) the original object and object hash can be checked with N records hashes for records to evaluate original object integrity; (4) the user and/or host can write to tape using Protected Record mode with the record hashes; (5) records can be read in Protected Mode with the tape drive doing the CRC32 check for each protected record read with written hash; (6) N record hashes from the tape can be compared with original N hash metadata for a closed-loop fixity check; and (7) because the read process ignores data but uses record hashes only with the tape drive doing the physical CRC32 checks per record, tape drives can stream at maximum speed with minimal back-hitches, thereby increasing tape drive and media life.

It is understood that although a number of different embodiments of a data quality integrity testing system have been illustrated and described herein, one or more features of any one embodiment can be combined with one or more features of one or more of the other embodiments, provided that such combination satisfies the intent of the present invention.

While a number of exemplary aspects and embodiments of the data quality integrity testing system have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method for ensuring data quality integrity on a magnetic tape, the method comprising the steps of:
    writing object data to the magnetic tape;
    dividing the object data into a plurality of data chunks;
    generating a hash tree from the plurality of data chunks, the hash tree being formed in a plurality of levels, the hash tree including (i) a plurality of chunk hashes wherein a separate chunk hash is generated for each of the plurality of data chunks, and (ii) at least one second level hash that is generated from concatenation of at least two of the plurality of chunk hashes; and
    checking integrity of a first data chunk of the plurality of data chunks by evaluating at least one of the plurality of chunk hashes and the at least one second level hash.

2. The method of claim 1 further comprising the step of generating an object hash from the object data.

3. The method of claim 2 wherein the step of generating a hash tree includes the hash tree including an upper-level hash that is generated from concatenation of at least two lower-level hashes.

4. The method of claim 3 further comprising the step of comparing the object hash and the upper-level hash with one another to determine if they correlate with one another such that there is no evidence of error within the object data.

5. The method of claim 4 further comprising the step of copying the object data to a tape for long-term archival storage if there is no evidence of error in the object data.

6. The method of claim 1 further comprising the step of formatting the magnetic tape by storing hash value metadata from the hash tree on the magnetic tape.

7. The method of claim 1 wherein the step of checking integrity includes performing fixity check for end-to-end data integrity without reading the object data from the magnetic tape.

8. The method of claim 7 wherein the step of performing fixity check for end-to-end data integrity is performed within a tape drive using a drive controller of the tape drive.

9. The method of claim 7 wherein the step of checking integrity further includes using inconsistencies from the fixity check to identify one or more data chunks in error due to one of data integrity and data quality issues.

10. The method of claim 9 further comprising the step of formatting the magnetic tape by storing updated hash value metadata from the hash tree on the magnetic tape based on error identified in the one or more data chunks.

11. A data quality integrity testing system for ensuring data quality integrity on a magnetic tape, the data quality integrity testing system comprising:
    a tape drive that is configured to write object data to the magnetic tape, the tape drive including a drive controller that is configured to perform the steps of:
    dividing the object data into a plurality of data chunks;
    generating a hash tree from the plurality of data chunks, the hash tree being formed in a plurality of levels, the hash tree including (i) a plurality of chunk hashes wherein a separate chunk hash is generated for each of the plurality of data chunks, and (ii) at least one second level hash that is generated from concatenation of at least two of the plurality of chunk hashes; and
    checking integrity of a first data chunk of the plurality of data chunks by evaluating at least one of the plurality of chunk hashes and the at least one second level hash.

12. The data quality integrity testing system of claim 11 wherein the drive controller is configured to further perform the step of generating an object hash from the object data.

13. The data quality integrity testing system of claim 12 wherein the drive controller generating a hash tree includes the hash tree including an upper-level hash that is generated from concatenation of at least two lower-level hashes.

14. The data quality integrity testing system of claim 13 wherein the drive controller is configured to further perform the step of comparing the object hash and the upper-level hash with one another to determine if they correlate with one another such that there is no evidence of error within the object data.

15. The data quality integrity testing system of claim 14 wherein the drive controller is configured to further perform the step of copying the object data to a tape for long-term archival storage if there is no evidence of error in the object data.

16. The data quality integrity testing system of claim 11 wherein the drive controller is configured to further perform the step of formatting the magnetic tape by storing hash value metadata from the hash tree on the magnetic tape.

17. The data quality integrity testing system of claim 11 wherein the drive controller checking integrity includes the drive controller performing fixity check for end-to-end data integrity without reading the object data from the magnetic tape.

18. The data quality integrity testing system of claim 17 wherein the drive controller checking integrity further includes the drive controller using inconsistencies from the fixity check to identify one or more data chunks in error due to one of data integrity and data quality issues.

19. The data quality integrity testing system of claim 18 wherein the drive controller is configured to further perform the step of formatting the magnetic tape by storing updated hash value metadata from the hash tree on the magnetic tape based on error identified in the one or more data chunks.

20. A method that includes using the data quality integrity testing system of claim 11.

* * * * *